William Zeiger.
Potato Peeler.
No. 89,190.   Patented April 20, 1869.
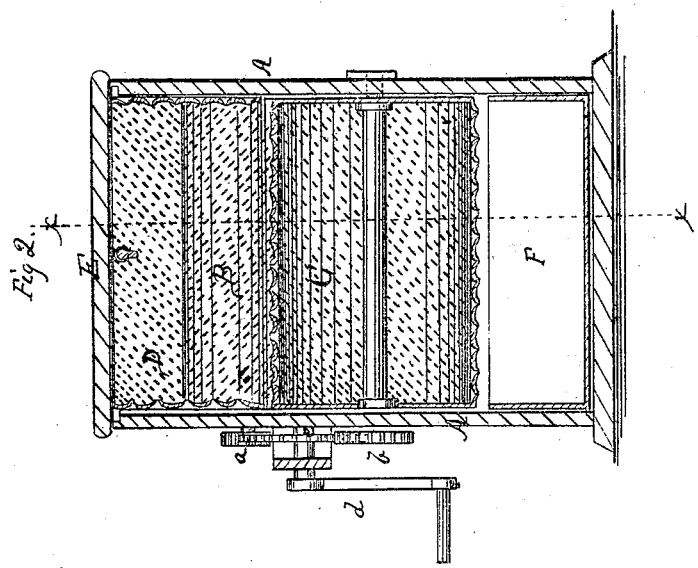
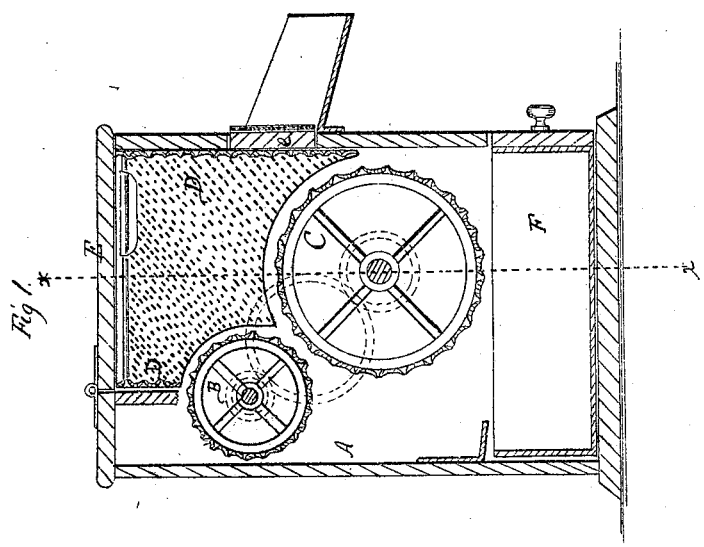
Witnesses:
Chas. Nida
John F. Brooks
Inventor:
W. Zeiger
per Munn & Co.
Attorneys

WILLIAM ZEIGER, OF ELMORE, OHIO.

Letters Patent No. 89,190, dated April 20, 1869.

IMPROVED POTATO-PEELER.

The Schedule referred to in these Letters Patent and making part of the same.

*To all whom it may concern:*

Be it known that I, WILLIAM ZEIGER, of Elmore, in the county of Ottawa, and State of Ohio, have invented a new and improved Potato-Peeler; and I do hereby declare that the following is a full, clear, and exact description thereof, which will enable others skilled in the art to make and use the same, reference being had to the accompanying drawings, forming part of this specification, in which—

Figure 1 represents a vertical transverse section of my improved potato-peeler.

Figure 2 is a vertical longitudinal section of the same.

Similar letters of reference indicate corresponding parts.

This invention relates to a new machine for peeling potatoes and other fruit; and consists in the application of revolving graters, and of a stationary removable grater, to operate in the desired manner for paring apples, potatoes, &c., as hereinafter more fully described.

A, in the drawing, represents a box, or case, in which are the bearings of two hollow cylinders, B and C, which are made of perforated sheet-metal, with projecting edges of apertures similar to graters.

They are geared together on the outside of the box by toothed wheels $a\ b$, that mesh into a toothed wheel, $c$, on which the operating-crank $d$ is secured.

Into the box is set, above the rollers B C, an open box, or case D, which lines the sides and ends of the box, as shown, and which consists of sheet-metal, perforated to form grating-surfaces on the inside, as shown.

The potatoes or other fruit to be pared are put into the box, through the opening in the top of the same, which is then closed by a cover, E.

When the cylinders are revolved, the fruit will be completely pared, and the parings will pass between the cylinders into a box, or drawer F, arranged below them, as shown. The fruit can then be taken out directly, or, by raising the case D, it will drop out through an aperture, $e$, in the side of the box A.

The machine can be readily cleaned by letting water pass through it, which will convey all impurities into the drawer E.

Having thus described my invention,

I claim as new, and desire to secure by Letters Patent—

The combination of the hollow perforated cylinders B and C with the movable grater-box D and aperture $e$, as and for the purpose set forth.

WILLIAM ZEIGER.

Witnesses:
   G. ZEIGER,
   WM. CALDWELL.